United States Patent [19]

Wuhrmann et al.

[11] Patent Number: 4,590,237

[45] Date of Patent: May 20, 1986

[54] FOAM REGULATORS CONTAINING PARAFFIN HYDROCARBONS AND HYDROPHOBIC SILICA

[75] Inventors: Juan C. Wuhrmann, Duesseldorf; Wolfgang Seiter, Neuss; Brigitte Giesen, Duesseldorf; Edmund Schmadel, Leichlingen, all of Fed. Rep. of Germany

[73] Assignee: Henkel Kommanditgesellschaft auf Aktien, Duesseldorf, Fed. Rep. of Germany

[21] Appl. No.: 688,207

[22] Filed: Jan. 2, 1985

[30] Foreign Application Priority Data

Jan. 2, 1984 [DE] Fed. Rep. of Germany ....... 3400008

[51] Int. Cl.$^4$ .................... C11D 1/86; C11D 1/38; C11D 1/68
[52] U.S. Cl. ...................... 524/480; 524/479; 252/99
[58] Field of Search ................. 524/480, 479; 252/99

[56] References Cited

U.S. PATENT DOCUMENTS

| | | | |
|---|---|---|---|
| 3,207,698 | 9/1965 | Liebling et al. | 252/321 |
| 3,235,509 | 2/1966 | Nitzsche et al. | 252/358 |
| 3,388,073 | 6/1968 | Domba | 252/321 |
| 4,056,481 | 11/1977 | Tate | 252/140 |
| 4,192,761 | 3/1980 | Peltre et al. | 252/99 |
| 4,339,342 | 7/1982 | Hempel et al. | 252/174 |
| 4,363,740 | 12/1982 | Curtis et al. | 252/91 |

FOREIGN PATENT DOCUMENTS

| | | |
|---|---|---|
| 0008829 | 3/1980 | European Pat. Off. . |
| 1467699 | 3/1973 | Fed. Rep. of Germany . |
| 1467614 | 3/1974 | Fed. Rep. of Germany . |
| 1099502 | 1/1968 | United Kingdom . |
| 1492939 | 11/1977 | United Kingdom . |
| 1560076 | 1/1980 | United Kingdom . |

OTHER PUBLICATIONS

Chemical Abstract: AB-Anti-Foaming Agents.

*Primary Examiner*—Morton Foelak
*Assistant Examiner*—M. L. Moore
*Attorney, Agent, or Firm*—Ernest G. Szoke; Henry E. Millson, Jr.; Mark A. Greenfield

[57] ABSTRACT

Foam regulators particularly suitable for use in surfactant-containing compositions, comprising a mixture of paraffin hydrocarbons and hydrophobic silica, preferably admixed with a carrier.

28 Claims, No Drawings

FOAM REGULATORS CONTAINING PARAFFIN HYDROCARBONS AND HYDROPHOBIC SILICA

BACKGROUND OF THE INVENTION

1. Field of the Invention

This invention relates to foam regulators particularly suitable for use in surfactant-containing compositions, comprising a mixture of paraffin hydrocarbons and hydrophobic silica. 2. Statement of the Related Art Paraffin hydrocarbons have already been repeatedly proposed as foam regulators for detergents and cleaners. According to British patent specification No. 1,099,502 and corresponding German patent application No. 14 67 699, the hydrocarbons are dispersed in aqueous, soap-containing detergent slurries and the resulting dispersion subsequently spray dried. In this process, however, a large part of the foam-inhibiting effect is lost. To correct that loss, it is necessary to use comparatively large quantities of paraffin, which results in a reduction in detergency. Accordingly, German patent application No. 14 67 614 proposes adding the paraffins to the washing powder after spray drying so that they form agglomerates with the detergent particles. However, the foam-inhibiting effect depends in this case, too, upon the presence of soap which confines the possible formulations to soap-containing mixtures.

U.S. Pat. No. 4,056,481 and corresponding German patent application No. 25 00 411 describe foam-regulated detergents which contain from 0.02 to 8% of a wax or wax mixture having a melting range of 35° to 125° C. The wax component, which preferably consists of microcrystalline waxes, is supposed to be present in intimate admixture with the surfactant component of the detergent. It can be shown that preparations such as these are virtually ineffectual with respect to anionic surfactants. In addition, known silicone defoamers may be added to the described preparations, as disclosed in Canadian Pat. No. 1,039,142 and corresponding German patent application No. 25 09 508. Particulate defoaming quantities of from 5 to 15% by weight, and from 0.5 to 2.1% of defoamer are required for adequate foam damping, which must be regarded as a disadvantage in view of the fact that paraffin hydrocarbons and waxes, similar to greasy stains, inhibit the cleaning effect of a detergent.

Preparations containing from 0.25 to 35% of wax, particularly microcrystalline wax, from 65 to 99.75% of nonionic surfactants and, as an optional constituent, silicones or silanized silica are the subject of British patent application No. 1,560,076, and corresponding German patent application No. 26 50 365. The foam-inhibiting effect of these mixtures is again largely confined to nonionic detergents. The same disadvantage attends the detergents according to European patent application No. 8,829 which contains from 3 to 30% of predominantly nonionic surfactants, from 10 to 96.9% of builder salts and from 1 to 5% of a defoamer. This defoamer consists of a homogenous dispersion of nonionic surfactants, silanized silica and paraffin or microcrystalline waxes melting at 35° to 110° C. and is applied to the preformed detergent particles in mixers.

U.S. Pat. No. 4,363,740 and corresponding European patent application No. 45,208 describe granular defoamers which are obtained by spraying a known meltable defoamer, preferably a paraffin wax, onto a granular base material. The temperature of the granular base material should be at least 15% below the solidification point of the defoamer. The granulates are preferably used in detergents and cleaners. It can be shown that defoamer mixtures of complex composition lead to non-reproducible results where this procedure is adopted.

U.S. Pat. No. 4,192,761 and corresponding German patent application No. 28 57 155, are of particular interest so far as the present invention is concerned, describing a detergent composition containing from 0.01 to 5% of a foam inhibitor. From 99.9 to 75% of this inhibitor consists of a mixture of a hydrocarbon liquid at room temperature with a solid hydrocarbon or wax ester, i.e. one melting at 35° to 100° C., and 0.1 to 25% of a hydrophobic (silanized) silica. The ratio in which the liquid and solid hydrocarbons are mixed is disclosed as between 30:70 and 98:2. The detergent component to be defoamed may consist of anionic and/or nonionic surfactants. Where anionic detergents are present in quantities of from 5 to 15% by weight, from 0.5 to 2.1% of defoamer are required for adequate foam damping, which must be regarded as a disadvantage in view of the fact that paraffin hydrocarbons and waxes, similar to greasy stains, inhibit the cleaning effect of a detergent.

U.S. Pat. No. 3,388,073 describes foam inhibitors for aqueous latex emulsions, paper pulp, and the like, there being no mention of detergent compositions. The inventive compounds disclosed are dialkyl substituted cyclic siloxanes, which are preferably dispersed in aliphatic hydrocarbon oils. The oils may include mineral seal oil and paraffin waxes, and are present in an amount of 60 to 99%.

DESCRIPTION OF THE INVENTION

Other than in the operating examples, or where otherwise indicated, all numbers expressing quantities of ingredients, ingredient properties or reaction conditions used herein are to be understood as modified in all instances by the term "about".

The present invention relates to foam regulators suitable for use in surfactant-containing compositions, particularly anionics, which contain a mixture of paraffin-hydrocarbons and hydrophobized silica and, optionally, a water-soluble carrier material. The foam regulators are more specifically defined by the following composition:

(a) from 5 to 60% by weight of microcrystalline paraffin wax having a solidification point of from 60° to 95° C., (b) from 15 to 60% by weight of hard paraffin having a solidification point of from 40° to 60° C., (c) from 1 to 50% by weight of soft paraffin having a solidification point of from 32° to 42° C., (d) from 3 to 18% by weight of hydrophobic, finely divided silica, the foam regulator being free from surfactants (as defined herein).

Paraffin waxes of the type used are generally complex mixtures without a clear melting point. Accordingly, they are characterized by measurement of the solidification point (S.P.) which is understood to be the temperature range in which the wax changes from the liquid into the solid state by slow cooling.

Component (a) comprises known microcrystalline paraffin waxes which have a solidification point of from 60° to 95° C. and preferably from 62° to 90° C. Microcrystalline waxes such as these are, for example a constituent of montan waxes and high-melting petroleum fractions (ceresin) and are distinguished by containing branched and cyclic paraffins. They make up from 5 to 60% by weight, preferably from 20 to 55% by weight, and more preferably, from 30 to 50% by weight of the foam regulators.

Component (b) comprises standard paraffin hydrocarbons which, in contrast to the microcrystalline waxes mentioned above, show more or less pronounced crystallization behavior. The solidification point of these hydrocarbons, which are generally known as hard paraffins, is from 40° to 60° C. and preferably from 42° to 56° C. They make up from 15 to 60% by weight, preferably from 20 to 50% by weight and, more preferably, from 25 to 45% by weight of the foam regulators.

The total quantity of components (a) and (b) in mixtures which do not contain any auxiliary components (discussed below) should amount to at least 50% by weight and preferably to between 65 and 85% by weight.

Component (c) is present in a quantity of from 1 to 50% by weight, preferably from 5 to 25% by weight, and comprises soft paraffin having a solidification point of from 32° to 42° C., preferably from 35° to 40° C. Paraffin fractions of this type are commercially available, under the designation "petroleum jelly".

Component (d) comprises finely divided, hydrophobic silica and makes up from 3 to 18% by weight, preferably from 5 to 15% by weight, of the mixture. Hydrophobic finely divided silica is understood to be silica produced by the treatment of microfines, (by precipitation from silicate solutions or by the pyrogenic decomposition of silicon tetrachloride), which have been reacted in known manner with organochlorosilanes, as described for example in U.S. Pat. Nos. 3,207,698 and 3,388,073. One example is a pyrogenic silicon dioxide which has been reacted with dimethyl dichlorosilane or trimethyl chlorosilane and which normally has a particle size of from 5 to 30 millimicrons. In addition, it is possible to use hydrophobic silicas of the type obtained by fixing organopolysiloxanes, for example polydimethyl siloxane, to silicon dioxide having a particle size in the above-mentioned range. Products such as these are known, for example, from U.S. Pat. No. 3,235,509.

Surfactants

An important feature of the foam regulator is the absence of surfactants from the inventive mixture. Surfactants are defined herein as surface-active compounds in which part of the molecule is hydrophobic, and which contain hydrophilic anionic, ampholytic, zwitterionic, cationic or nonionic groups, developing a cleaning or emulsifying effect in aqueous solution or dispersion. The hydrophobic part of the molecule generally consists of a hydrocarbon residue or of a substituted hydrocarbon residue or of a polyglycol ether residue which is difficultly soluble in water, for example a polypropylene glycol or polybutylene glycol ether residue. Compounds having a nonpolar molecular structure, particularly water-soluble and water-dispersible polymers which are also capable under certain conditions of developing a dispersing effect in water, such as carboxymethyl cellulose, polyethylene glycol, polyvinyl alcohol, polyvinyl pyrrolidone and polyacrylates, do not fall under the definition of "surfactants" and may be present in the compositions according to the invention.

Process of Manufacture

To produce the foam regulator, the wax components are melted and mixed together. The hydrophobic silica is dispersed in the resulting mixture. It is also possible initially to disperse the hydrophobic silica in one of the components of the mixture and then to mix the resulting dispersion with the other components. After the individual components have been thoroughly mixed, the mixture is solidified by cooling and best converted into free-flowing particles. This may be done by: mechanical size reduction, for example by grinding or by extruding and subsequently chopping the extruded strands; by cooling on a flaking roller; by pressing and pelletizing; or by spray cooling, for example by spraying into a cooling gas stream. If the foam regulator is to be added to a powdered detergent, it is advisable to select its particle size so that it is about the same particle size as the washing powder, in order to prevent separation. Suitable products have a particle size of from 0.1 to 1.5 mm and preferably from 0.2 to 1 mm for this purpose.

Auxiliary Components

In one preferred embodiment, the foam regulator comprising the wax components and hydrophobic silica may be admixed with auxiliary components comprising at least one branched-chain alcohol of the formula

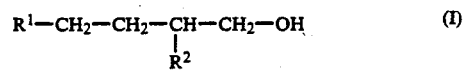

$$R^1-CH_2-CH_2-CH-CH_2-OH \quad (I)$$
$$\phantom{R^1-CH_2-CH_2-CH}|\phantom{-CH_2-OH}$$
$$\phantom{R^1-CH_2-CH_2-C}R^2$$

in which $R^1$ and $R^2$ may be the same or different and are each $C_{4-16}$-alkyl radicals, the total number of carbon atoms in the alcohol amounting to between 16 and 30. The ratio in which the foam regulator comprising components a+b+c+d is mixed with the alcohol corresponding to formula I is 1:1–50, preferably 1:2–25. Suitable alcohols are, in particular, Guerbet alcohols which may be obtained in known manner from straight-chain saturated $C_{6-16}$-alcohols, for example by heating in the presence of strong alkali.

Alcohols in which $R^1$ and $R^2$ are each straight chain are preferred. Alcohols in which $R^1$ and $R^2$ are each $C_{6-12}$-alkyl are also preferred. Examples of suitable $R^1$ and/or $R^2$ substituents include N-butyl, isobutyl, pentyl, hexyl, heptyl, octyl, decyl, undecyl, tridecyl, tetradecyl, hexadecyl and the like. Examples of suitable alcohols include 2-butyl dodecanol, 2-octyl octanol, 2-octyl dodecanol, 2-hexadecyl tetradecanol, 2-decyl eicosanol, 2-pentyl nonanol, 2-nonyl undecanol, 2-hexyl dodecanol, 2-hexyl decanol, and the like. These examples are not intended as limiting. The use of these alcohols in admixture with silanized silica as a foam inhibitor is known, for example, from U.S. Pat. No. 4,339,342 and corresponding German patent application No. 30 13 391. Adding these alcohols to the inventive foam regulator comprising the paraffin mixture and silanized (hydrophobic) silica can enhance its effect and improve processability.

In mixtures containing alcohols corresponding to formula I, the proportion of component (c) may be higher than in alcohol-free mixtures. Thus, it is possible with advantage to use mixtures consisting of from 2 to 20 parts by weight of a mixture of
from 20 to 45% by weight of component (a),
from 15 to 40% by weight of component (b),
from 20 to 50% by weight of component (c),
from 5 to 15% by weight of component (d),
and an alcohol corresponding to formula I, q.s. to 100 parts by weight.

Carriers

In the following, the term "foam regulator" is used both for the compositions comprising components a+b+c+d and also for mixtures thereof with the auxiliary components, i.e. alcohols corresponding to formula I.

In one preferred embodiment, the foam regulator is adsorbed on a water soluble carrier. Suitable carriers are, primarily, water soluble inorganic salts, such as sodium sulfate, sodium chloride, sodium carbonate, sodium silicate, sodium borate, sodium phosphate and sodium polyphosphates, such as sodium tripolyphosphate, and also mixtures of these salts. Instead of the sodium salts, it is also possible to use the potassium salts. It is preferred to use mixtures of sodium sulfate and sodium silicate having the ratio of $Na_2O:SiO_2 = 1:2-3.5$, mixtures of sodium tripolyphosphate and sodium silicate having the indicated ratio and, in particular, a ternary mixture of sodium sulfate, sodium tripolyphosphate and sodium silicate having the indicated ratio.

In the binary mixtures, the sodium silicate content amounts to between 5 and 25% by weight and the sodium tripolyphosphate or sodium sulfate content to between 95 and 75% by weight, based in each case on anhydrous salts. The water content of these mixtures in the form of water of hydration and slight traces of moisture normally amounts to between 5 and 20% by weight. In the ternary mixtures, the sodium silicate content again amounts to between 5 and 25% by weight, the sodium sulfate content to between 20 and 50% by weight and the tripolyphosphate content to between 10 and 50% by weight. Ternary mixtures of from 5 to 15% by weight of sodium silicate having the ratio of $Na_2O:SiO_2 = 1:3-3.5$, of from 30 to 50% by weight of sodium sulfate, from 25 to 45% by weight of sodium tripolyphosphate and from 7 to 18% by weight of water have proved to be particularly suitable. The production of a granular carrier such as this is best carred out by spray drying an aqueous slurry of the salts in question by means of hot gases flowing in parallel current or in countercurrent. The temperature of the drying gases on entry is generally in the range from 200° to 450° C., their exit temperature being in the range from 75° to 100° C. The spray-dried granular carrier is freed from dust and coarse particles by sieving or air separation and has a particle size of from 0.1 to 1.6 mm and a powder density of from 500 to 700 g/l.

The granular carrier is then mixed with the molten foam regulator which is preferably done by spraying the melt onto the mechanically or pneumatically moved carrier material. It has proved to be of advantage to treat the still warm carrier particles, i.e. the carrier particles leaving the spraying tower, in this way or to preheat particles cooled to room temperature, for example by means of warm flowing air. Particularly uniform distribution of the foam regulator and reproducible results are obtained in this way. The particulate carrier best has a temperature during mixing which is of the order of the solidification point of the hydrocarbon mixture plus/minus 20° C. and preferably plus/minus 10° C.

Useful granulates can also be produced by kneading the foam-inhibiting component and the carrier salt together in a mixer at a temperature within or above the melting range of the paraffin mixture and size-reducing the resulting mixture during the following cooling period into particles having the required size by means of suitable chopping tools. In this way, it is possible with advantage to process granulates containing more than 5% by weight of paraffin mixture.

Another particularly prefered method of producing a pourable granulate comprising the foam regulator and particulate carrier is wherein a carrier salt or mixture of carrier salts, (preferably the above-described mixture of sodium silicate, sodium sulfate and sodium tripolyphosphate), is dissolved or dispersed in water together with the molten foam regulator and the resulting solution or dispersion spray-dried in the above-described manner.

Since the salt-containing aqueous solution and the paraffin-containing melt are not miscible with one another, the aqueous solution or dispersion has to be intensively mixed all the time, i.e. until it is spray-dried, in order to obtain homogeneous and finely dispersed distribution of the foam re9ulator in the salt solution. This may be done, for example, by intensively pump-recirculating the aqueous solution or by dispersion through circulation systems. The desired homogenization and finely dispersed distribution of the foam regulator may be considerably improved by adding to the mixture water-soluble polymers, particularly cellulose ethers, such as carboxymethyl cellulose, hydroxyalkyl cellulose, methyl cellulose, cellulose mixed ethers or mixtures of the above-mentioned polymers, in quantities of from 0.3 to 3% by weight, based on the anhydrous constituents. The addition of surfactant-like dispersants (corresponding to the above definition) is not recommended and should if possible be avoided, because it may seriously impair the effectiveness of the foam regulator.

The quantities of foam regulator to be added to the granular carrier prepared in advance or to the aqueous solution or dispersion to be spray dried should be measured in such a way that a non-tacky or non-greasy granulate having adequate pourability and fluidity is obtained while still being in a foam-regulative amount. Depending on the composition of the carrier and, in particular, on its porosity or absorbency, up to 25% by weight and, in most cases, between 2 and 20% by weight (based on the final granulate) may be applied to the carrier. Quantities of from 4 to 15% by weight of foam-regulating components and from 96 to 85% by weight of water-soluble carrier have proven to be particularly appropriate in that they guarantee ready processability of the mixtures and enable the solid granulate to be handled without difficulty. If the carrier additionally contains the abovementioned water soluble polymers, which are intended to improve the dispersibility of the molten paraffins in the aqueous solution or dispersion to be spray dried, the polymers may be present in a quantity of from 0.1 to 5% by weight and preferably in a quantity of from 0.5 to 3% by weight.

Although less than 4% by weight of foam regulator may be present in the granulate without any adverse effect upon foam inhibition, it is necessary in that case to process and add to the detergents relatively large quantities of salt. Accordingly, there is little to commend this procedure. In addition, it is possible to increase the stability of the foam regulator in storage and to improve the fluidity of the granulates by powdering them, i.e. coating them with a fine layer of water soluble or dispersible materials. Suitable coating materials are, for example, the salts or mixtures of salts used as carriers, adsorbents, such as finely dispersed silicon dioxide, or powdered organic polymers and cellulose ethers such as methyl or carboxymethyl cellulose. In general, however, an aftertreatment such as this is not necessary because the foam-inhibiting granulates according to the invention already show very high stability in storage and satisfactory flow properties.

Other additives may also be introduced in relatively small quantities, although they should not have any adverse effect upon the favorable properties of the foam regulators. Additives of the type in question include, for example, optical brighteners, dyes and pigments. These additives should generally make up no more than 1% by weight of the final granulate.

Quantity of Foam Regulator Employed

The foam regulators and mixture thereof with carriers are suitable for use in numerous fields in which foaming caused by surfactants is completely or partly suppressed. However, they are particularly suitable for use in powdered or granular detergents and cleaners. Accordingly, the present invention also relates to the use of the foam regulators or mixtures thereof with carriers in those products. Depending on the composition of these products, quantities of only 0.005 to 0.5% by weight, preferably 0.01 to 0.3% by weight of foam regulator are sufficient for effective foam reduction or foam inhibition. Larger additions, i.e. up to 1% by weight, based on the detergent or cleaner, are also possible and may be advisable in individual cases where particularly high foaming substances are present in relatively large quantities. Accordingly, the carrier-containing granulates are used in such quantities that the content of foam regulator is in the range specified above. Depending on the foam regulator content of the granulate, quantities of from 1 to 10% by weight and preferably from 2 to 6% by weight of granulate are required for that purpose.

The detergents and cleaners in which the foam regulators according to the invention may advantageously be used, may be any compositions, and may contain standard anionic, zwitterionic, ampholytic, nonionic and cationic surfactants; water soluble and water insoluble builder salts; detergent range alkalis; bleaches; and other additives which improve detergency and which influence the appearance or condition of the material being treated. Of particular interest in this respect are detergents in which the surfactant component is predominantly anionic, i.e. heavily foaming, washing-active substances of the sulfate or sulfonate type. Detergents such as these normally contain from 5 to 30% by weight of surfactants, of which more than 50% by weight are supposed to consist of anionic compounds. The discovery that the foam regulators according to the invention reliably prevent undesirable foaming in high-foam detergents containing anionic surfactants, even when used in quantities of less than 0.1% by weight, must be regarded as extremely surprising.

EXAMPLES

The mixtures shown in Table 1, which are solid at room temperature, were prepared by melting the individual constituents and dispersing the silanized silica (S.P.=solidification point). The melt was sprayed in a stream of cold air to form particles 0.2 to 1 mm in diameter.

TABLE 1

| Mixture component | Composition | | |
|---|---|---|---|
| (% by weight) | A | B | C |
| (a) Microcrystalline wax S.P. 85–86° C. | 44 | 35 | 24 |
| (b) Paraffin S.P. 42–44° C. | 34 | 30 | 30 |

TABLE 1-continued

| Mixture component | Composition | | |
|---|---|---|---|
| (% by weight) | A | B | C |
| (c) Petroleum jelly S.P. 34–38° C. | 10 | 20 | 40 |
| (d) Silanized silica | 12 | 15 | 15 |

The follwing mixtures of compositions A and C with technical 2-octyl dodecanol (alcohol of formula I in which $R^1 = R^2 = C_8H_{17}$), which are liquid at room temperature, were also prepared.

TABLE 2

| Mixture component (% by weight) | Composition | | |
|---|---|---|---|
| | D | E | F |
| Composition A | 10 | — | — |
| Composition C | — | 10 | 20 |
| 2-octyl dodecanol | 90 | 90 | 80 |

To produce a solid granulate (composition G), a mixture heated to 90° C. of 88 parts by weight of anhydrous, granular sodium tripolyphosphate (Na-TPP) and 12 parts by weight of foam regulator A was kneaded in a mixer equipped with a rotating screw and, after cooling to room temperature, the strand produced was reduced to a particle size of from 0.2 to 0.8 mm.

In a second series of tests, 12 parts by weight of composition A were melted by heating to 80° C. and were sprayed in a high-speed mixer onto 88% by weight of Na-TPP which had been heated beforehand to 80° C. (composition H).

In a third series of tests, 10 parts by weight of composition E liquid at room temperature were sprayed onto 90 parts by weight of Na-TPP in the same way as described above in series H, a pourable granulate J again being obtained.

In another series of tests, spray dried carrier salts were used. Granulate K was produced from a slurry (water content 43% by weight) which contained only the carrer salts. The spray dried salt mixture was then mixed with the molten foam regulator in a mixer at a temperature of 80° C. In the preparation of granulate L, the slurry sprayed (water content 42% by weight) contained a mixture of cellulose ethers (2 parts of methyl cellulose, 1 part of Na-carboxymethyl cellulose) and also the molten foam regulator in addition to the carrier salts. The slurry was intensively mixed until just before spraying in order to avoid phase separation. Both slurries were sprayed in a spray tower equipped with nozzles, the drying air flowing in countercurrent having an entry temperature of 200° C. and an exit temperature of 87° C.

TABLE 3

| Component (% by weight) | Composition | |
|---|---|---|
| | K | L |
| Na silicate ($Na_2O:SiO_2 = 1:3.5$) | 10.4 | 10.5 |
| Na—TPP | 30.8 | 31.3 |
| Na sulfate | 40.4 | 41.2 |
| Water | 10.9 | 11.0 |
| Cellulose ether mixture | — | 1.0 |
| Foam regulator A | 7.5 | 5.0 |
| Powder density (g/l) | 620 | 600 |
| Particle size (mm) | 0.2–0.8 | 0.2–0.8 |

Performance testing was carried out in a commercially available washing machine (horizontally mounted drum) which was loaded with 3 kg of clean cotton fabrics. The front window of the washing machine was divided into 4 equal sections above the liquid level. Foaming was assessed on a scale of 0 to 6 in which 0 = no foam
1 = foam height ¼
2 = foam height ½
3 = foam height ¾
4 = foam height 4/4
5 = foam visible in the feed pipe
6 = overfoaming The composition of the detergents used is shown in Table 4. The sodium salt of the α-sulfofatty acid methyl ester of hydrogenated palm kernel oil fatty acid was used as the Na-sulfo ester salt. The abbreviation E.O. stands for mols of ethylene oxide added. The salts consist of Na-perborate, Na-silicate and Na-sulfate.

TABLE 4

| Detergent components | % by weight | |
|---|---|---|
| | D1 | D2 |
| Na—dodecyl benzene sulfonate | 9.0 | — |
| Na—sulfo ester salt | — | 9.0 |
| Ethoxylated tallow alcohol 5 EO | 3.0 | 3.0 |
| Ethoxylated tallow alcohol 10 EO | 1.5 | 1.5 |
| Soap (tallow/coco) | 2.4 | 2.4 |
| Na—carboxymethylcellulose | 1.0 | 1.0 |
| Na—TPP | 20.0 | 20.0 |
| Zeolite NaA | 17.0 | 17.0 |
| Salts, water, defoamer | balance | balance |

The detergent concentration amounted to 10 g/l. The foam regulator was added to the powdered detergent in each case. Softened water having a hardness of 3° dH (30 mg of CaO/l) was used. The washing machine was switched on (normal program without prewash) and the height of the foam read off as a function of the temperature. The results are shown in Table 5. The heading "foam regulator, % by weight" applies to the quantity of active substance used, i.e. carrier salts were not included, the percentage being based on the total weight of the detergent powders.

TABLE 5

| Example No. | Foam Regulator | | Detergent | Foaming at | | |
|---|---|---|---|---|---|---|
| | Type | % by weight | | 40° | 60° | 95° |
| — | — | — | D1 | 6 | 6 | 6 |
| — | — | — | D2 | 6 | 6 | 6 |
| 1 | A | 0.01 | D1 | 4 | 3 | 2 |
| 2 | A | 0.05 | D1 | 2 | 1 | 0.5 |
| 3 | A | 0.1 | D1 | 1 | 0.5 | 0.5 |
| 4 | A | 0.01 | D2 | 3 | 2 | 2 |
| 5 | A | 0.05 | D2 | 2 | 0.5 | 0.5 |
| 6 | A | 0.1 | D2 | 0.5 | 0 | 0 |
| 7 | B | 0.01 | D1 | 3 | 2 | 2 |
| 8 | B | 0.05 | D1 | 2 | 1 | 1 |
| 9 | B | 0.1 | D1 | 2 | 0.5 | 0.5 |
| 10 | C | 0.01 | D1 | 2 | 2 | 3 |
| 11 | C | 0.05 | D1 | 1.5 | 0.5 | 1 |
| 12 | C | 0.1 | D1 | 0.5 | 0 | 0 |
| 13 | C | 0.01 | D2 | 3 | 2 | 2 |
| 14 | C | 0.05 | D2 | 2 | 0.5 | 0 |
| 15 | C | 0.1 | D2 | 0 | 0 | 0 |
| 16 | D | 0.05 | D2 | 2 | 1 | 0 |
| 17 | E | 0.05 | D2 | 2 | 1 | 0.5 |
| 18 | F | 0.05 | D2 | 1.5 | 1 | 1.5 |
| 19 | G | 0.01 | D1 | 3 | 3 | 2 |
| 20 | G | 0.05 | D1 | 2 | 1 | 0.5 |
| 21 | G | 0.1 | D1 | 1 | 0.5 | 0 |
| 22 | H | 0.01 | D1 | 4 | 3 | 1.5 |
| 23 | H | 0.05 | D1 | 2 | 0.5 | 0 |
| 24 | H | 0.1 | D1 | < | 0.5 | 0 |
| 25 | H | 0.01 | D2 | 3 | 2 | 1.5 |
| 26 | H | 0.05 | D2 | 2 | 0.5 | 0.5 |
| 27 | H | 0.1 | D2 | 0 | 0 | 0 |
| 28 | I | 0.01 | D1 | 4 | 3 | 2 |

TABLE 5-continued

| Example No. | Foam Regulator | | Detergent | Foaming at | | |
|---|---|---|---|---|---|---|
| | Type | % by weight | | 40° | 60° | 95° |
| 29 | I | 0.05 | D1 | 2 | 1 | 0.5 |
| 30 | I | 0.1 | D1 | 1 | 0 | 0 |
| 31 | K | 0.01 | D1 | 4 | 3 | 2 |
| 32 | K | 0.05 | D1 | 2 | 1 | 0.5 |
| 33 | K | 0.1 | D1 | 1 | 0.5 | 0 |
| 34 | L | 0.01 | D1 | 4 | 3 | 2 |
| 35 | L | 0.05 | D1 | 3 | 1 | 0.5 |
| 36 | L | 0.1 | D1 | 1 | 0.5 | 0 |
| 37 | L | 0.01 | D2 | 3 | 2 | 2 |
| 38 | L | 0.05 | D2 | 2 | 1 | 0.5 |
| 39 | L | 0.1 | D2 | 1 | 0 | 0 |

A number of mixtures of washing powder and foam regulator were stored for 3 months at 30° C. and then tested for their effect in the same way as described in the foregoing. The results are shown in Table 6.

TABLE 6

| Example No. | Foam Regulator | | Detergent | Foaming at | | |
|---|---|---|---|---|---|---|
| | Type | % by weight | | 40° | 60° | 95° |
| 40 | A | 0.05 | D1 | 5 | 4 | 4 |
| 41 | D | 0.05 | D1 | 5 | 4 | 4 |
| 42 | G | 0.05 | D1 | 2 | 1 | 0.5 |
| 43 | H | 0.05 | D1 | 3 | 2 | 1 |
| 44 | I | 0.05 | D1 | 4 | 3 | 2 |
| 45 | K | 0.05 | D1 | 3 | 1.5 | 0.5 |
| 46 | L | 0.05 | D1 | 2 | 1 | 0.5 |

The results show that, where a carrier is present, the stability of the foam regulator increases during storage. Optimal stability in storage is obtained when the mixture consisting of foam regulator and carrier is compacted (Example 42) or sprayed (Example 46). High stability in storage is also obtained where a special, particularly absorbent mixture of carrier salts, to which the defoamer is applied, is used (Example 45).

COMPARISON TESTS

Defoamer mixtures A and C were mixed with a nonionic surfactant (tallow alcohol+5 E.O.) in a ratio of 1:3, the molten mixtures were sprayed in cold air and added to the washing powder (mixtures CA and CC). The test series H was repeated with the difference that the temperature of the basic powder was 25° C. (mixture CH). In addition, components (b) and (c) in mixture C were replaced by the same quantity of a liquid paraffin oil. This mixture was sprayed onto 9 times the quantity by weight of Na-TPP in the same way as described in I (composition CI). After the above-mentioned preparations had been tested, the results shown in Table 7 were obtained.

TABLE 7

| Test | Foam Regulator | Detergent | Foaming | | |
|---|---|---|---|---|---|
| | % by weight | | 40° | 60° | 95° |
| CA | 0.05 | D1 | 6 | 6 | 6 |
| | 0.1 | | 6 | 6 | 6 |
| CC | 0.05 | D1 | 6 | 6 | 6 |
| | 0.0 | | 5 | 6 | 6 |
| CH | 0.05 | D1 | 4 | 4 | 3 |
| | 0.1 | | 3 | 3 | 2 |
| CI | 0.05 | D1 | 4 | 5 | 4 |
| | 0.1 | | 3 | 3 | 2 |

The introduction of the foam regulator into a nonionic surfactant results in overfoaming of the anionic detergent in the concentration range indicated (tests CA and CC). If the molten defoamer is applied to a cold carrier, the mixtures obtained are inhomogenous and have a diminished effect (test CH). Replacement of the solid paraffin components (b) and (c) by liquid paraffins also results in a loss of effect (test CI).

We claim:

1. A foam regulator composition for in surfactant-containing products, consisting essentially of a mixture of
   (a) microcrystalline paraffin wax having a solidification point of about 60° to 95° C., in an amount of about 5 to 60%;
   (b) hard paraffin having a solidification point of about 40° to 60° C., in an amount of about 15 to 60%;
   (c) soft paraffin having a solidification point of about 32° to 42° C., in an amount of about 1 to 50%; and
   (d) hydrophobic, finely divided silica, in an amount of about 3 to 18%;
all percentages being by weight based on the total weight of the mixture, said composition being free from surfactants.

2. The foam regulator of claim 1 wherein said component (a) has a solidifiction point of about 62° to 90° C. and is present in an amount of about 20 to 55%.

3. The foam regulator of claim 1 wherein component (a) has a solidification point of about 62° to 90° C. and is present in an amount of about 30 to 50%.

4. The foam regulator of claim 1 wherein component (b) has a solidification point of about 42° to 56° C. and is present in an amount of about 20 to 50%.

5. The foam regulator of claim 1 wherein component (b) has a solidification point of about 42° to 56° C. and is present in an amount of about 25 to 45%.

6. The foam regulator of claim 1 wherein component (a) and component (b) are together present in an amount of at least about 50%.

7. The foam regulator of claim 1 wherein component (a) and component (b) are together present in an amount of about 65 to 85%.

8. The foam regulator of claim 1 wherein component (c) has a solidification point of about 35° to 40° C. and is present in an amount of about 5 to 25%.

9. The foam regulator of claim 1 wherein component (d) is present in an amount of about 5 to 15%.

10. The foam regulator of claim 1 wherein component
    (a) has a solidification point of about 62° to 90° C. and is present in an amount of about 20 to 55%.
    (b) has a solidification point of about 42° to 56° C. and is present in an amount of about 20 to 50%.
    (c) has a solidification point of about 35° to 40° C. and is present in an amount of about 5 to 25%; and
    (d) is present in an amount of about 5 to 15%.

11. The foam regulator of claim 10 wherein component (a) and component (b) are together present in an amount of about 65 to 85%.

12. The foam regulator of claim 1 further admixed with an auxiliary component which is at least one alcohol of the formula $$R^1-CH_2-CH_2-CH-CH_2-OH$$
$$\hspace{4em}|$$
$$\hspace{4em}R^2$$

wherein: $R^1$ and $R^2$ may be the same or different and each are $C_{4-16}$-alkyl, the total number of carbon atoms being between 16 and 30.

13. The foam regulator of claim 12 wherein $R^1$ and $R^2$ are each straight chain.

14. The foam regulator of claim 12 wherein $R^1$ and $R^2$ are each a $C_{6-12}$-alkyl.

15. The foam regulator of claim 12 wherein about 2 to 20 parts by weight of said mixture of (a), (b), (c), and (d) is admixed with said auxiliary component present q.s. to 100 parts by weight.

16. The foam regulator of claim 15 wherein: component
    (a) is present in about 20 to 45%;
    (b) is present in about 15 to 40%;
    (c) is present in about 20 to 50%;
    (d) is present in about 5 to 15%.

17. The foam regulator of claim 1 adsorbed on a water-soluble granular carrier whose particles have a grain size of about 0.1 to 1.6 mm.

18. The foam regulator of claim 12 adsorbed on a water-soluble granular carrier whose particles have a grain size of about 0.1 to 1.6 mm.

19. The foam regulator of claim 17 wherein said foam regulator composition is about 2 to 20% by weight of the adsorbed granulate.

20. The foam regulator of claim 18 wherein said foam regulator composition is about 2 to 20% by weight of the adsorbed granulate.

21. The foam regulator of claim 17 wherein said mixture of (a), (b), (c) and (d) is adsorbed while in a molten state and said carrier granules are heated.

22. The foam regulator of claim 18 wherein said mixture of (a), (b), (c) and (d) is adsorbed while in a molten state and said carrier granules are heated.

23. The foam regulator of claim 21 wherein the temperature of said carrier is plus/minus 20° C. of the solidification point of said molten mixture.

24. The foam regulator of claim 22 wherein the temperature of said carrier is plus/minus 20° C. of the solidification point of said molten mixture.

25. The foam regulator of claim 21 wherein said mixture of (a), (b), (c), and (d) is adsorbed while in the form of an aqueous solution or dispersion and said adsorbed granules are then spray dried.

26. The foam regulator of claim 23 wherein said mixture of (a), (b), (c), and (d) is adsorbed while in the form of an aqueous solution or dispersion and said adsorbed granules are then spray dried.

27. The foam regulator of claim 25 wherein water-soluble polymers are added to said aqueous solution or dispersion in a quantity of about 0.3 to 3% by weight based on the weight of the anhydrous constituents, prior to admixture with said granular carrier.

28. The foam regulator of claim 26 wherein water-soluble polymers are added to said aqueous solution or dispersion in a quantity of about 0.3 to 3% by weight based on the weight of the anhydrous constituents, prior to admixture with said granular carrier.

* * * * *